United States Patent Office 2,904,447
Patented Sept. 15, 1959

2,904,447

PROCESS FOR PIGMENT PRINTING OF FLEXIBLE FLAT STRUCTURES

Ernst Hochuli and Hermann Werdenberg, Basel, and Willy Fisch, Binningen, Switzerland, assignors to Ciba Limited, Basel, Switzerland, a Swiss firm No Drawing. Application April 11, 1955
Serial No. 500,694

Claims priority, application Switzerland April 15, 1954

4 Claims. (Cl. 117—38)

Many proposals have been made for fixing on flat structures of various kinds, such as fabrics or foils, dyestuffs, for example, pigments, which have no affinity for the structure, with the aid of binding agents. However, this involves numerous difficulties. It is, of course, an essential prerequisite for the success of such printing processes that the binding agent should adhere well to the surface to be printed on, but this alone does not suffice to ensure success. Thus, for example, it is also necessary that the printing composition should have a suitable viscosity or can be given a suitable viscosity by the addition of a thickener or a diluent. Moreover, difficulties often arise due to the fact that the printing paste, of which the viscosity has been suitably adjusted, runs on the surface to be printed on or adheres poorly in printing, so that for one or another reason good designs are not produced, especially those having fine outlines. Furthermore, there is the main difficulty that the prints obtained after the fixing operation are either too soft, so that they become damaged or destroyed by all kinds of mechanical influences, or are too brittle to follow any deformation of the printed flat structure. Both of these conditions can lead to prints of insufficient fastness to rubbing. Finally, in many cases, especially in printing on flexible flat structures, such as fabrics or foils, it often happens that the print imparts a wholly undesirable stiffness to the structure, whereby its usefulness is usually considerably diminished.

The resistance of the binding agent to chemical influences, for example, wet treatments in the presence of alkaline substances, such as in washing, is in many cases insufficient. Moreover, it is often necessary that the binding agent should possess considerable resistance to the action of light, because discoloration of the binding agent sometimes causes an undesired change in the tint produced, or because the adhesion of the print may be impaired by other changes occurring in the binding agent.

Many of the proposals already made do overcome a few of the difficulties mentioned above, but do not solve other problems.

The present invention is based on the observation that flat structures, especially flexible ones, can be printed with dyestuffs, especially pigments, having no affinity for the structure by using as binding agent a hardenable mixture consisting essentially of a polyglycidylether of an hydroxy-compound containing at least two hydroxyl groups.

The polyglycidylethers used as starting materials in the present process are known, and it is also known that these products, after being hardened, possess good adhesion on various materials, especially metals. However, it could not be foreseen that these products, which have been proposed especially for adhesively uniting metals, would possess the further properties necessary for pigment printing.

The polyglycidylethers used in the present process, which are also known as "ethoxyline resins," are derived from polyhydric phenols, such as resorcinol, and especially polynuclear phenols in which, for example, two hydroxy-benzene radicals are connected together by an aliphatic bridge of low molecular weight, for example, a methylene group or especially a 2:2'-propylene group. The polyglycidylethers can be obtained from the appropriate polyhydric phenols in known manner by reaction with epichlorhydrin in a molecular ratio of approximately 1:2. For carrying out the reaction a proportion of 1.2, 1.4 or more molecular proportions of epichlorhydrin per molecule proportion of polyhydric phenol may be used, and, if there is an excess of epichlorhydrin, it is of advantage to distil off at least a part of the unconsumed epichlorhydrin after the reaction.

It may also be of advantage to use polyglycidyl ethers, which are derived from aliphatic hydroxy-compounds, especially polyhydric alcohols, such as glycol, its homologues or analogues. For preparing such polyglycidyl ethers it is of advantage to use, for example, the process of patent application, Serial No. 416,954, filed March 17, 1954, by P. Züppinger, W. Hofmann and W. Fischer, in which an organic compound containing, apart from 2 to 4 alcoholic hydroxyl groups, no other groups capable of reacting with epoxy groups is reacted with preferably more than one molecular proportion of epichlorhydrin per hydroxyl equivalent of the said organic compound in the presence of a strong alkali in a single operation.

As hardening agents for the polyglycidylether a very large number of substances can be used. For the present invention it is in many cases advantageous to use hardening agents of the amine type, many of which are liquid, such as tris-(dimethylamino-methyl)-phenol, triethylene tetramine, diethylene triamine or dimethylamino-propylamine. Other hardening agents described in the literature may also be used, for example, inner anhydrides of dicarboxylic acids, complex compounds of boron trifluoride and amines, mixtures of dicarboxylic acid anhydrides with comparatively small amounts of amines, especially tertiary amines, such as a mixture of hexahydrophthalic acid anhydride and tris-(dimethylamino-methyl)-phenol, as well as mixtures of different di- and polycarboxylic acid anhydrides and those skilled in the art will have no difficulty by making simple tests in finding other hardening agents that can be used or are especially suitable in the present process.

When the polyglycidylether does not itself possess the proper pasty consistency for printing, it can be brought to the appropraite consistency advantageously by the addition of a relatively small proportion of an organic solvent which has a boiling point and a speed of evaporation suitable for printing purposes, such as toluene or diacetone alcohol or a mixture of two or more such solvents. Solvents that boil very easily and evaporate rapidly, such as acetone, may also be used, provided that care is taken by the use of suitable apparatus during printing that disturbances due to too rapid evaporation are avoided.

Since, after the addition of the hardening agent, the composition to be used is of limited stability, it is of advantage first to incorporate the pigment in the printing composition consisting, for example, of the polyglycidylether and, if desired, a solvent. This may be carried out, for example, in a funnel mill or plate mill, if the pigment has not already been specially prepared. In some cases it is of advantage to use the pigment in the form of a pigment preparation, which contains about 50% or more of any desired lacquer base and in which the pigment particles have previously been finely dispersed. Such preparations are described, for example, in British patent application No. 686,269 and U.S. patent application, Serial No. 365,763, filed July 2, 1953, by W. Grubenmann, and now Patent No. 2,755,195. Such pigment preparations can often be prepared by the simple mixing of the pigment with the polyglycidylether or with a solution of the latter in a suitable solvent.

It is of advantage to incorporate the hardening agent only just before the printing process is commenced.

The flat structure to be printed may be foils of regenerated cellulose, polyvinyl chloride, polyethylene, acetyl-cellulose and like materials. For this purpose polyglcidylethers of aliphatic polyhydroxy-compounds are sometimes especially suitable, and in some cases the hardening temperature should not be high, for example, below 95° C. The present process is also especially suitable for printing flat structures having a fabric structure composed, for example, of normal textile fibres, such as cotton, artificial silk of a cellulose ester or regenerated cellulose; and it is of special importance that various fabrics that are difficult to print by ordinary textile printing processes, for example, fabrics of polyamides, polyesters, polyacrylonitrile or copolymers of polyacrylonitrile and especially glass fibers, are readily printed by the present process.

Owing to the favorable properties of the printing compositions used in the present process, printing may be carried out by any of the known methods, for example, hand printing, screen printing, roller printing, with the aid of stenciles or other known methods.

The prints are advantageously fixed by a simple heat treatment, for example, at 90° C. or higher. In the case of materials that withstand high temperatures, such as glass fibers, hardening temperatures up to 180° C. or higher may be used, whereas in the case of heat-sensitive materials fixing is preferably carried out at room temperature or a temperature at or below 100° C.

The prints produced by the present process are not only fixed surprisingly well, but are generally very elastic and very resistant to chemical and physical influences. A particular advantage of the present process is that, in contradistinction to known processes, no special thickening agent is required. It is surprising that the pigments are fixed well against mechanical and chemical influences having regard to the great softness of the prints produced.

The following examples illustrate the invention, the parts and percentages being by weight:

*Example 1*

A polyglycidylether is prepared by reacting one molecular proportion of 4:4'-dihydroxy-diphenyl-dimethyl-methane of the formula

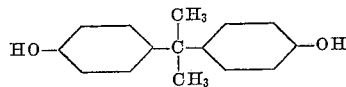

with about 1.6 molecular proportion of epichlorhydrin in the manner described in the second paragraph of U.S. patent application Serial No. 177,774, filed August 4, 1950, by W. Fischer (now U.S. Patent No. 2,712,535, issued July 5, 1955). With the dry product a solution of 70% strength in toluene is prepared.

200 parts of the toluene solution and 6 parts of a pigment preparation, consisting of about 33% of the azo-dyestuff from diazotized 2:5-dichloroaniline and 1-(2'-hydroxy-3'-naphthoylamino)-2:5-dimethoxy-benzene, or of copper phthalocyanine in a finely dispersed condition and about 67% of hydrogenated colophony glycerine ester, are thoroughly mixed together, for example, by being ground for 2 hours in a ball mill. After the addition of 13.3 parts of triethylene tetramine the composition is printed on a fabric of glass fibers in a roller printing machine. After drying and hardening at 180° C. for 20 minutes, there is obtained an elastic blue print of good covering power, fastness to rubbing and very good adhesion, which is unaffected by being boiled for ½ hour with a solution containing, per liter, 5 grams of soap and 2 grams of sodium carbonate.

Instead of the 13.3 parts of triethylene tetramine other hardening agents may be used, for example, 14 parts of tris-(dimethyl-amino-methyl-)phenol, 42 parts of hexahydrophthalic acid anhydride or 17 parts of piperidine-boron trifluoride complex, hardening being carried out for 40 minutes at 180° C.

*Example 2*

300 parts of the toluene solution described in Example 1 are mixed with 90 parts of titanium dioxide (rutile form), and the mixture is finely ground in a funnel mill or plate mill. 54 parts of a mixture of equal parts of diacetone-alcohol and toluene are added. 4 parts of triethylene tetramine are added to every 100 parts of the resulting printing composition, and ordinary commercial foils of regenerated cellulose are printed with the composition through a screen printing stencil having fine outlines. After drying the prints, hardening is carried out for 30 minutes at 100° C., and there are obtained white matt effects of good covering power and fastness to rubbing, which are soft, have sharp outlines, and cannot be scratched off by the finger nails.

If the toluene and other solvents present in the printing compositions of this and other examples happen to be undesirable, a liquid polyglycidylether free from solvents may be used which is obtained from 4:4'-dihydroxy-dimethyl methane and a great excess of epichlorhydrin with an epoxy equivalent weight of about 200 (1 epoxide equivalent in 200 grams). The printing composition is prepared as described and before printing 8 parts of triethylene tetramine are added to every 100 parts of the resulting composition.

*Example 3*

250 parts of the toluene solution described in Example 1 are mixed with 20 parts of the azo-dyestuff from diazotized 1-amino-2-nitro-4-methyl-benzene and acetoacetylamino-benzene, and the mixture is very finely ground in a funnel mill or plate mill. 49 parts of a mixture of equal parts of diacetone-alcohol and toluene are added. After the addition of 4 parts of triethylene tetramine for every 100 parts of printing composition a fabric of glass fibers is printed through a nylon gauze stencil, dried and hardening is carried out for 20 minutes at 180° C. There are obtained yellow prints of good covering power and with sharp outlines, which possess excellent adhesion and are fast to acids and alkalies.

*Example 4*

258 parts of the toluene solution described in Example 1 are finely ground in a ball mill with 20 parts of the azo-dyestuff from diazotized 1-amino-2-nitro-4-methyl-benzene and 2-hydroxynaphthalene. 45 parts of toluene are added and, before the printing process, 4 parts of triethylene tetramine are added to every 100 parts of printing composition. With this printing composition there are produced on ordinary regenerated cellulose foils by the roller printing method with the use of shallow engraved rollers red pigment prints, which, after a hardening treatment at 95° C. for 30 minutes, are distinguished by their very good adhesion, fastness to rubbing and soft character.

Instead of 4 parts of triethylene tetramine a mixture of 17 parts of hexahydrophthalic acid anhydride and 0.17 part of tris- (dimethylamino methyl) phenol may be added and the hardening period should be extended to 1 hour at 95° C.

*Example 5*

100 parts of the toluene solution described in Example 1 are ground three times with 25 parts of titanium dioxide (rutile form) and 5 parts of copper phthalocyanine in a funnel mill. There are added 18 parts of a 50/50 mixture of diacetone-alcohol and toluene, and then 4.5 parts of triethylene tetramine for every 100 parts of printing composition. The composition is printed on a fabric of polyacrylonitrile ("Orlon"), or of a copolymer of vinyl chloride and acrylonitrile ("Dynel") or of a terephthalic acid-glycol polyester ("Dacron"), and depending on the properties of the fiber a hardening treatment is carried out for 10 minutes at 120° C. to 5 minutes at 150° C. There are produced blue prints which are soft and keep their sharp outlines and which possess a very high fastness to rubbing in the dry and wet state and are fast to boiling.

*Example 6*

360 parts of the toluene solution described in Example 1 are finely ground with 15 parts of carbon black suitable as a pigment, 12 parts of diacetone-alcohol and 13 parts of toluene in a funnel mill. After the addition of a further 20 parts of toluene and 20 parts of diacetone-alcohol, there are added 5.2 parts of triethylene tetramine for every 100 parts of printing composition, and the composition is printed on foils of acetyl-cellulose or regenerated cellulose by means of a screen printing stencil. After drying the prints, they are subjected to a hardening treatment at about 95° C. for 30 minutes, and there are obtained deep black elastic prints which remain sharp and are of good fastness to rubbing and have good adhesion.

*Example 7*

62 parts (1 mol) of ethylene glycol and 370 parts (4 mols) of epichlorhydrin are heated at 70° C. in a flask fitted with stirring means and a reflux condenser. In the course of one hour there are then added 80 parts of pulverized sodium hydroxide (2 mols) in 14 portions, and at the same time the temperature of the mixture is maintained at 70–75° C. by external cooling. The excess of epichlorhydrin is then removed in vacuo, the residue in the flask is stirred with monochlorobenzene, filtered off with suction and washed with the solvent last mentioned. The filtrate is evaporated in vacuo at 80–120° C. There are obtained about 167 parts of a yellow liquid product having a content of 4.78 epoxide equivalents per kilogram.

With the polyglycidyl ether so obtained the following printing compositions are prepared:

(a) 50 parts of the polyglycidyl ether are mixed with 34 parts of a toluene solution of 70 percent strength of the kind described in the first paragraph of Example 1, and 8 parts of titanium dioxide (rutile form) and 2 parts of copper phthalocyanine in the form of the pigment preparation described in Example 1 are added, and the mixture is ground finely in a funnel mill. The composition is then diluted with a further quantity of about 6 parts of a mixture of equal parts of diacetone-alcohol and toluene.

Before the printing process, 7.75 parts of triethylene tetramine are added per 100 parts of printing composition.

(b) 60 parts of the above polyglycidyl ether are mixed with 7.5 parts of a pigment preparation containing about 33 percent of highly chlorinated copper phthalocyanine and about 67 percent of hydrogenated colophony glycerine ester. 3.5 parts of toluene are added, and the mixture is finely ground in a funnel mill, and a further 6.5 parts of toluene are added.

Before the printing process 10 parts of triethylene tetramine are added for every 100 parts of printing composition.

(c) 60 parts of the above polyglycidyl ether, 60 parts of the toluene solution of 70 percent strength described in the first paragraph of Example 1, 5 parts of carbon black specially prepared for pigment purposes and about 11 parts of toluene are mixed together, and the whole is very finely ground in a funnel mill. The composition is then diluted with about 11 parts of toluene.

Before the printing process 8.7 parts of dimethyl-amino-propylamine are added for every 100 parts of printing composition.

The above printing compositions (a), (b) and (c) are printed by the screen printing process with the use of a fine meshed nylon gauze stencil or by the roller printing process with the use of shallow engraved rollers, on to foils of polyethylene ("Alkathene") and on water-resistant foils of regenerated cellulose, and the prints are dried. The foils are then heated at about 90° C., and preferably not above 95° C., for 5–10 minutes. In this manner the binding agent is hardened, and the hardening period may be somewhat longer in the case of relatively thick foils.

In the foregoing examples a slight change in the composition of the polyglycidylether may necessitate an increase or more probably a reduction in the quantity of solvent added in order to obtain a printing composition of suitable consistency for printing, because slight changes in the quantity of glycerine dichlorhydrin or epichlorhydrin used in preparing the polyglycidylether markedly change the physical properties of the derivative.

What is claimed is:

1. A process for printing polyethylene foils which comprises applying to the said foils a dyestuff having no affinity for the polyethylene foils, said dyestuff being in intimate admixture with a binder, which binder consists essentially of a hardenable mixture of a polyglycidylether of a hydroxy compound containing at least two hydroxyl groups and a hardening agent selected from the group consisting of polyalkylene polyamines and tertiary amines, and subsequently fixing the print within the temperature range from room temperature to at most 100° C.

2. A process according to claim 1, wherein the polyethylene foil is heated to at least 90° C. for fixing the print.

3. A process for printing polyethylene foils which comprises applying to the said foils a dyestuff having no affinity for the polyethylene foils, said dyestuff being in intimate admixture with a binder, which binder consists essentially of a hardenable mixture of a polyglycidylether obtained by the reaction of more than one molecular proportion of a compound selected from the group consisting of epichlorhydrin and glycerol dichlorhydrin with a di-(hydroxyphenyl)-alkane, and a hardening agent selected from the group consisting of polyalkylene polyamines and tertiary amines, and subsequently fixing the print within the temperature range from room temperature to at most 100° C.

4. A process for printing polyethylene foils which comprises applying to the said foils a dyestuff having no affinity for the polyethylene foils, said dyestuff being in intimate admixture with a binder, which binder consists essentially of a hardenable mixture of a polyglycidylether obtained by the reaction of more than one molecular proportion of a compound selected from the group consisting of epichlorhydrin and glycerol dichlorhydrin with an aliphatic hydroxy compound containing at least two hydroxy groups, and a hardening agent selected from the group consisting of polyalkylene polyamines and tertiary amines, and subsequently fixing the print within the temperature range from room temperature to at most 100° C.

References Cited in the file of this patent

UNITED STATES PATENTS

| | | |
|---|---|---|
| 2,500,600 | Bradley | Mar. 14, 1950 |
| 2,550,047 | Durr | Apr. 24, 1951 |
| 2,641,554 | Meunier | June 9, 1953 |
| 2,682,515 | Naps | June 29, 1954 |
| 2,694,694 | Greenlee | Nov. 16, 1954 |
| 2,707,177 | Skiff | Apr. 26, 1955 |
| 2,709,664 | Evans | May 31, 1955 |
| 2,736,719 | Stockmayer | Feb. 28, 1956 |
| 2,801,229 | De Hoff | July 30, 1957 |
| 2,809,184 | Langer | Oct. 8, 1957 |

FOREIGN PATENTS

| | | |
|---|---|---|
| 139,496 | Australia | Nov. 22, 1950 |